United States Patent
Tanabe et al.

(10) Patent No.: US 11,402,993 B2
(45) Date of Patent: Aug. 2, 2022

(54) ELECTRONIC DEVICE, CONTROL METHOD, AND RECORDING MEDIUM

(71) Applicant: KYOCERA Corporation, Kyoto (JP)

(72) Inventors: Shigeki Tanabe, Yokohama (JP); Yasuhiro Ueno, Yokohama (JP); Hideki Morita, Yokohama (JP); Isao Masuike, Machida (JP); Koutaro Yamauchi, Yokohama (JP); Manabu Sakuma, Yokohama (JP); Kenji Shimada, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 16/843,802

(22) Filed: Apr. 8, 2020

(65) Prior Publication Data
US 2020/0333948 A1  Oct. 22, 2020

(30) Foreign Application Priority Data
Apr. 17, 2019 (JP) .............................. JP2019-078885

(51) Int. Cl.
*G06F 3/04883* (2022.01)
*G06F 3/04817* (2022.01)
*G06F 3/04845* (2022.01)

(52) U.S. Cl.
CPC ...... *G06F 3/04883* (2013.01); *G06F 3/04817* (2013.01); *G06F 3/04845* (2013.01); *G06F 2203/04803* (2013.01)

(58) Field of Classification Search
CPC ............. G06F 3/04883; G06F 3/04817; G06F 3/04845; G06F 2203/04803
See application file for complete search history.

(56) References Cited

U.S. PATENT DOCUMENTS

| | | | |
|---|---|---|---|
| 10,037,083 B2 | 7/2018 | Nii | |
| 10,318,034 B1* | 6/2019 | Hauenstein | G06F 3/0412 |
| 2009/0237371 A1* | 9/2009 | Kim | G06F 3/0488 |
| | | | 345/173 |
| 2011/0221776 A1* | 9/2011 | Shimotani | G06F 3/0481 |
| | | | 345/647 |
| 2012/0159386 A1* | 6/2012 | Kang | G06F 3/04883 |
| | | | 715/800 |
| 2014/0085259 A1* | 3/2014 | Lee | G06F 3/04883 |
| | | | 345/174 |
| 2015/0346831 A1 | 12/2015 | Nii | |
| 2016/0062452 A1* | 3/2016 | Kim | G06F 3/011 |
| | | | 345/661 |
| 2018/0129333 A1* | 5/2018 | Zheng | G06F 3/04166 |

FOREIGN PATENT DOCUMENTS

JP   2015-225493 A   12/2015
WO   2013/135286 A1   9/2013

* cited by examiner

*Primary Examiner* — Sherrod L Keaton
(74) *Attorney, Agent, or Firm* — Studebaker & Brackett PC

(57) ABSTRACT

An electronic device includes a first sensor for detecting a gesture that does not come into contact with the electronic device, a second sensor for detecting a touch that comes into contact with the electronic device, and a controller. The controller increases the size of an icon, displayed on a display, when a gesture is detected by the first sensor. The controller increases the size of the icon in accordance with the distance to the position where the gesture detected by the first sensor is performed. The controller decreases the size of the icon when a touch is detected by the second sensor, regardless of the distance to the position where the gesture detected by the first sensor is performed.

10 Claims, 14 Drawing Sheets

ELECTRONIC DEVICE, CONTROL METHOD, AND RECORDING MEDIUM

CROSS-REFERENCE TO RELATED APPLICATION

The present application claims priority to and the benefit of Japanese Patent Application No. 2019-078885 filed Apr. 17, 2019, the entire contents of which are incorporated herein by reference.

TECHNICAL FIELD

The present disclosure relates to an electronic device, a control method, and a recording medium.

BACKGROUND

Electronic devices, such as smartphones and tablets, typically include a touch panel. A user typically controls such an electronic device by touching the touch panel. An electronic device that detects a gesture, performed by the user at a distance from the terminal, using an infrared sensor, for example, and then processes an input operation corresponding to the gesture is known. The user can operate an electronic device that includes a sensor for detecting gestures (gesture sensor) without touching the electronic device.

SUMMARY

An electronic device according to an embodiment includes a first sensor for detecting a gesture that does not come into contact with the electronic device, a second sensor for detecting a touch that comes into contact with the electronic device, and a controller. The controller increases the size of an icon when a gesture is detected by the first sensor, the icon being displayed on a display, the size of the icon being increased in accordance with a distance to a position where the gesture detected by the first sensor is performed. The controller decreases the size of the icon when a touch is detected by the second sensor, the size of the icon being decreased regardless of the distance to the position where the gesture detected by the first sensor is performed.

A control method according to an embodiment includes detecting, using a first sensor, a gesture that does not come into contact with an electronic device; detecting, using a second sensor, a touch that comes into contact with the electronic device; increasing a size of an icon when a gesture is detected by the first sensor, the icon being displayed on a display, the size of the icon being increased in accordance with a distance to a position where the gesture detected by the first sensor is performed; and decreasing the size of the icon when a touch is detected by the second sensor, the size of the icon being decreased regardless of the distance to the position where the gesture detected by the first sensor is performed.

A non-transitory computer-readable recording medium according to an embodiment stores computer program instructions, which when executed by a computer, cause the computer to detect, using a first sensor, a gesture that does not come into contact with an electronic device; detect, using a second sensor, a touch that comes into contact with the electronic device; increase a size of an icon when a gesture is detected by the first sensor, the icon being displayed on a display, the size of the icon being increased in accordance with a distance to a position where the gesture detected by the first sensor is performed; and decrease the size of the icon when a touch is detected by the second sensor, the size of the icon being decreased regardless of the distance to the position where the gesture detected by the first sensor is performed.

DETAILED DESCRIPTION

The applicant has studied an electronic device that includes both a touch sensor, such as a touch panel, and a gesture sensor. The applicant has also submitted several patent applications based on the results of this research. Such an electronic device would have better operability if user operation could be appropriately detected and processing executed in accordance with the detection result. The present disclosure relates to providing an electronic device, a control method, and a recording medium that have improved operability. Embodiments of the present disclosure can provide an electronic device, a control method, and a recording medium that have improved operability.

(Electronic Device Configuration)

Figure 1:
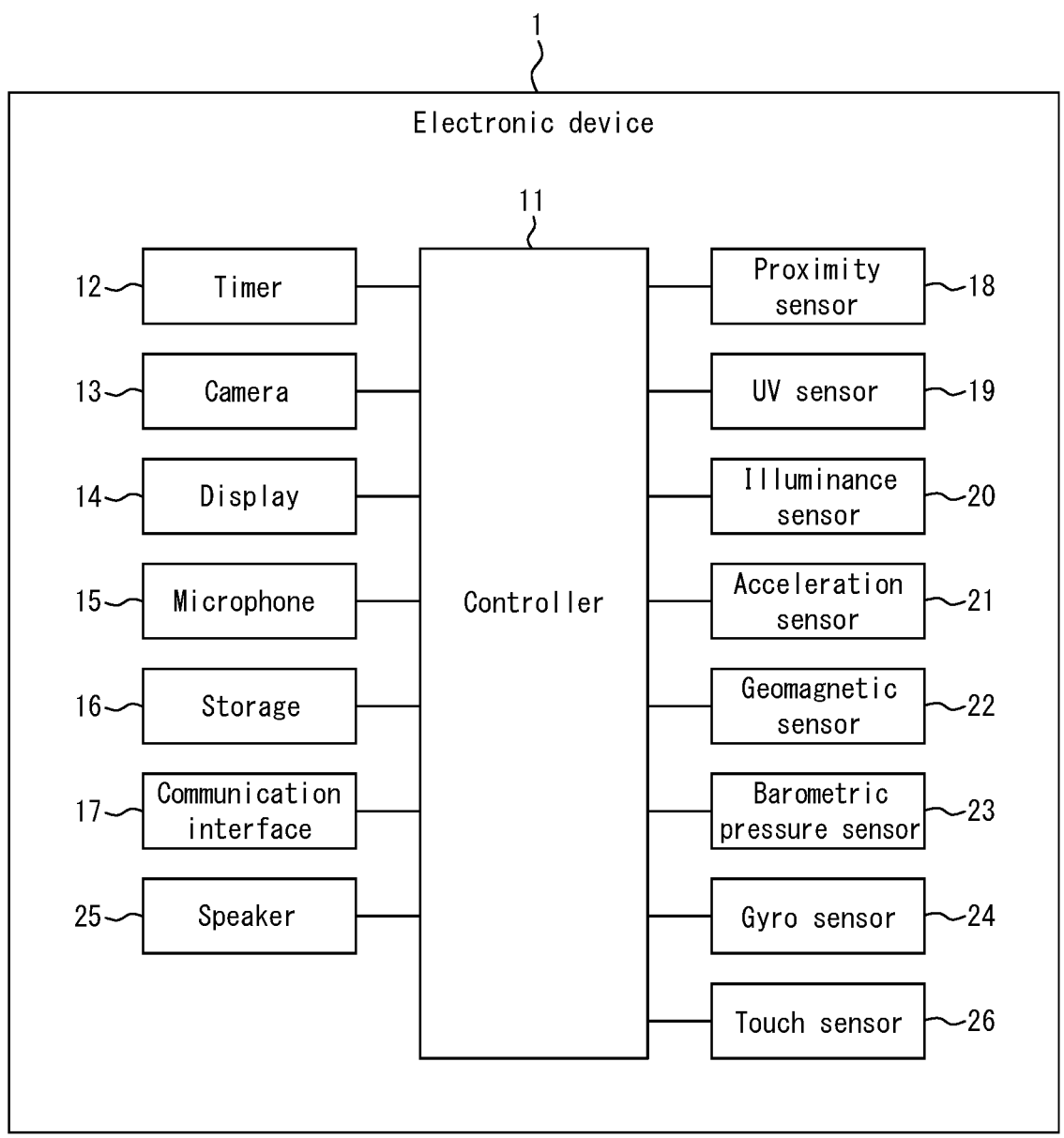
FIG. 1 illustrates the schematic configuration of an electronic device according to an embodiment.

As illustrated in FIG. 1, an electronic device 1 according to an embodiment includes a controller 11, a timer 12, a camera 13, a display 14, a microphone 15, a storage 16, a communication interface 17, and a proximity sensor 18 (gesture sensor). The electronic device 1 further includes a UV sensor 19, an illuminance sensor 20, an acceleration sensor 21, a geomagnetic sensor 22, a barometric pressure sensor 23, a gyro sensor 24, a speaker 25, and a touch sensor 26. FIG. 1 is only an example, and a portion of the components in FIG. 1 may be omitted from the electronic device 1. The electronic device 1 may also include components other than those illustrated in FIG. 1.

The electronic device 1 may, for example, be implemented as a mobile phone, a phablet, a tablet personal computer (PC), a smartphone, a feature phone, or the like. The electronic device 1 is not limited to the above-described devices and may be implemented as any of a variety of devices. For example, the electronic device 1 may be implemented as a personal digital assistant (PDA), a remote control, a portable music player, a game device, an e-book reader, a household appliance, an industrial device, i.e. a factory automation (FA) device, or the like. The electronic device 1 may also be a dedicated device that detects a user operation and executes processing corresponding to the operation. The electronic device 1 according to an embodiment is described below as being implemented as a device such as a smartphone or table PC that has a function to detect user operation.

The electronic device 1 may be implemented as a device for publicity/advertising such as digital signage. In this case, the electronic device 1 may be a (relatively large) display-type device installed in a location such as a train station or a public facility.

When mounted in a moveable body such as a car, the electronic device 1 may be implemented as a car navigation system or other such device mounted in the car. The moveable body in which the electronic device 1 is mounted is not limited to being a car. The moveable body may, for example, encompass vehicles, ships, and aircraft. The vehicles may, for example, include electric cars, hybrid electric cars, gasoline cars, motorcycles, bicycles, welfare vehicles, and the like. The vehicles may include railway vehicles. The moveable body may be driven or piloted by the user. At least a portion of user operations related to driving or piloting of the moveable body may be automated. The moveable body is not limited to user operation and may move independently. In this case, the electronic device 1 may be connected in a wired or wireless manner to allow communication with a system mounted in the car that the user is driving. For example, the electronic device 1 may be implemented as a smartphone and connected via Bluetooth® (Bluetooth is a registered trademark in Japan, other countries, or both) to allow communication with a system mounted in the car. The electronic device 1 is not limited to these examples and may be implemented as any device used for driving or piloting of the moveable body.

The timer 12 receives an instruction for timer operation from the controller 11. When a predetermined time has elapsed, the timer 12 outputs a signal indicating the elapse to the controller 11. The timer 12 may be provided independently from the controller 11, as illustrated in FIG. 1, or be internal to the controller 11.

The camera 13 captures images of subjects around the electronic device 1. An example of the camera 13 is a front camera provided on the surface where the display 14 of the electronic device 1 is provided. Another example of the camera 13 is a back camera provided on the back surface of the housing of the electronic device 1 (the opposite surface from the surface where the display 14 is provided). The camera 13 may include a front camera and a back camera. The camera 13 may, for example, be configured to include an imaging element that performs photoelectric conversion, such as a charge coupled device (CCD) sensor or a complementary metal oxide semiconductor (CMOS) sensor.

The display 14 displays screens. A screen includes at least one of characters, images, symbols, graphics, or the like, for example. The display 14 may be a liquid crystal display, an organic electro-luminescence panel, an inorganic electro-luminescence panel, or the like. In the present embodiment, the display 14 may be a touch panel display (touchscreen display) integrated with the touch sensor 26. The touch panel display detects contact by a finger, a stylus pen, or the like and identifies the contact position. The display 14 can simultaneously detect a plurality of positions contacted by fingers, stylus pens, or the like.

The microphone 15 detects sound around the electronic device 1, including people's voices. The microphone 15 may convert sound detected as air vibration by a diaphragm, for example, to an electric signal.

The storage 16 stores programs and data. The storage 16 temporarily stores the processing results of the controller 11. The storage 16 may include any appropriate storage device, such as a semiconductor storage device or a magnetic storage device. The storage 16 may also include a plurality of types of storage devices. The storage 16 may include a combination of a portable storage medium, such as a memory card, and an apparatus for reading the storage medium.

The programs stored in the storage 16 include applications that run in the foreground or the background and a control program that supports operations of the applications. For example, the applications cause the controller 11 to execute processing corresponding to a gesture. The control program is, for example, an operating system (OS). The applications and the control program may be installed on the storage 16 through communication by the communication interface 17 or from a storage medium. The data stored in the storage 16 includes various information such as still images (photographs), video, and text information. These pieces of information can be acquired and updated via the communication interface 17.

The communication interface 17 is for communicating over a wired or wireless connection. The communication method of the communication interface 17 in an embodiment is prescribed by a wireless communication standard. For example, wireless communication standards include cellular phone communication standards such as 2G, 3G, 4G, and 5G. Examples of cellular phone communication standards include long term evolution (LTE), wideband code division multiple access (W-CDMA), CDMA2000, personal digital cellular (PDC), global system for mobile communications (GSM® (GSM is a registered trademark in Japan, other countries, or both)), and personal handy-phone system (PHS). Examples of wireless communication standards include worldwide interoperability for microwave access (WiMAX), IEEE802.11, Bluetooth®, infrared data association (IrDA), and near field communication (NFC). The communication interface 17 may support one or more of the aforementioned communication standards.

The speaker 25 outputs sound. For example, the speaker 25 outputs audio to guide the way to an inputted destination of the car. When the electronic device 1 is implemented as a device capable of making phone calls, the speaker 25 may, for example, output the other party's voice during a phone call. When, for example, the news, a weather forecast, or the like is to be read, the speaker 25 may output the content thereof as sound or voice.

Without contact, the proximity sensor 18 detects the relative distance to an object around the electronic device 1, the movement direction of the object, and the like. In the present embodiment, the proximity sensor 18 includes one infrared light emitting diode (LED) acting as a light source and four infrared photodiodes. The proximity sensor 18 emits infrared light, from the infrared LED acting as a light source, towards an object. Reflected light from the object is incident on the infrared photodiodes of the proximity sensor 18. The proximity sensor 18 can measure the relative distance to the object based on the output current of the infrared photodiodes. The proximity sensor 18 also detects the movement direction of the object by the difference in time at which reflected light from the object is incident on each of the infrared photodiodes. The proximity sensor 18 can thus detect an operation by an air gesture (gesture) that the user of the electronic device 1 performs without touching the electronic device 1. The proximity sensor 18 may include visible light photodiodes.

The controller 11 is a processor such as a central processing unit (CPU). The controller 11 may be a system-on-a-chip (SoC) or other type of integrated circuit in which other components are integrated. The controller 11 may be configured by combining a plurality of integrated circuits. The controller 11 implements a variety of functions by controlling overall operation of the electronic device 1.

When the electronic device 1 is implemented as a car navigation system mounted in a car, the controller 11 of the electronic device 1 may, for example, be configured by an electric control unit or engine control unit (ECU) included in the car.

The controller 11 refers as necessary to data stored in the storage 16. The controller 11 implements a variety of functions by executing instructions included in programs stored in the storage 16 to control other functional components, such as the display 14. For example, the controller 11 acquires information on a user gesture detected by the proximity sensor 18. When the electronic device 1 is operable by a touch panel, for example, the controller 11 acquires data on contact by the user from the touch panel. The controller 11 also acquires information detected by sensors other than the proximity sensor 18, for example.

In the present embodiment, the controller 11 functions as a display driver that controls display of the display 14. The controller 11 in the present embodiment can, in other words, display images by directly controlling the display 14. As another embodiment, a display driver may be provided independently from the controller 11. In this case, the controller 11 may display images on the display 14 via the display driver.

The UV sensor 19 can measure the amount of ultraviolet light included in sunlight or other light.

The illuminance sensor 20 detects the illuminance from surrounding light that is incident on the illuminance sensor 20. A photodiode, for example, may be used in the illuminance sensor 20. A phototransistor, for example, may be used in the illuminance sensor 20.

The acceleration sensor 21 detects the direction and magnitude of acceleration acting on the electronic device 1. The acceleration sensor 21 outputs information of the detected acceleration as an output signal. The acceleration sensor 21 is, for example, a three-axis (3D) sensor that detects acceleration in the x-axis, y-axis, and z-axis directions. The acceleration sensor 21 may, for example, be a piezoresistive sensor or a capacitive sensor.

The geomagnetic sensor 22 can measure the orientation of the electronic device 1 by detecting the orientation of the earth's magnetic field.

The barometric pressure sensor 23 detects the barometric pressure (atmospheric pressure) outside of the electronic device 1.

The gyro sensor 24 detects the angular velocity of the electronic device 1. The controller 11 can measure the change in orientation of the electronic device 1 by integrating the angular velocity, acquired by the gyro sensor 24, over time.

(Gesture-Based Operation of Electronic Device)

Figure 2:
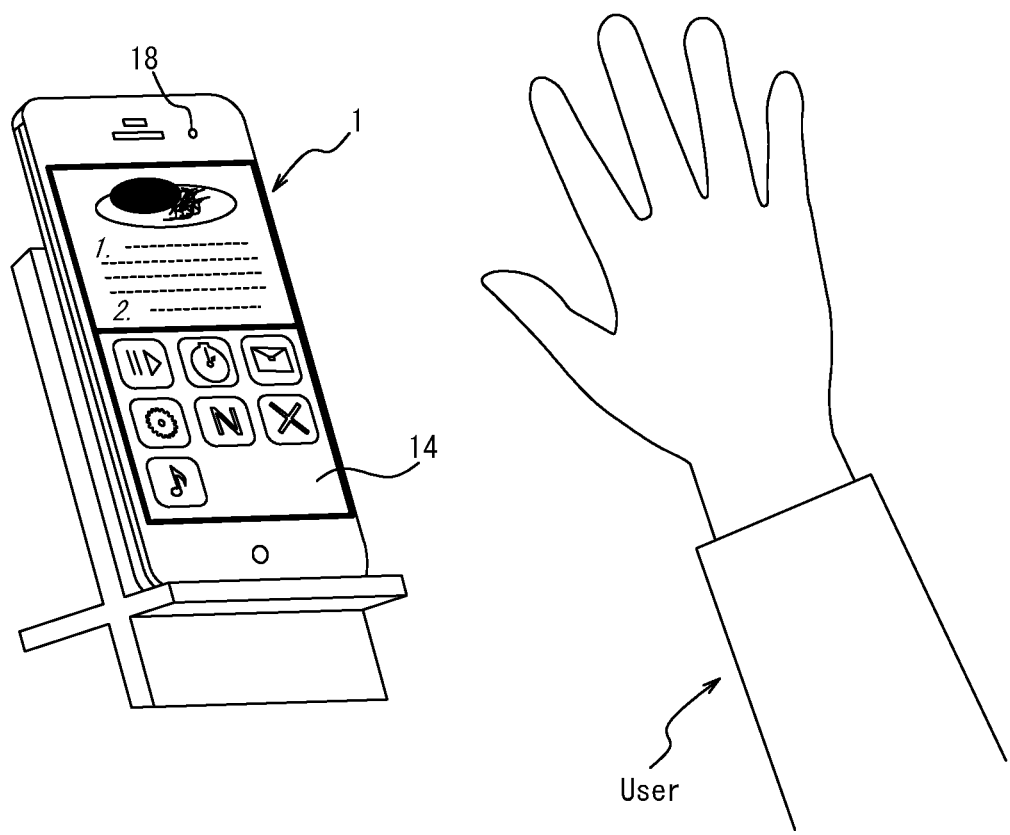
FIG. 2 illustrates a user operating an electronic device with a gesture.

FIG. 2 illustrates the user operating the electronic device 1 with a gesture. In FIG. 2, the electronic device 1 is supported by a stand as an example. Alternatively, the electronic device 1 may be leaned against a wall or placed on a table. Upon the proximity sensor 18 detecting a gesture by the user, the controller 11 executes processing based on the detected gesture. In the example in FIG. 2, the processing in response to the gesture is scrolling of the screen displaying a recipe. For example, when the user makes a gesture by moving a hand upward in the longitudinal direction of the electronic device 1, the screen scrolls upward in accordance with the movement of the user's hand. When the user makes a gesture by moving a hand downward in the longitudinal direction of the electronic device 1, the screen scrolls downward in accordance with the movement of the user's hand. Here, instead of gesture detection by the proximity sensor 18, the controller 11 may perform gesture detection based on an image captured by the camera 13.

In the example in FIG. 2, the screen is split in two. In the example in FIG. 2, a recipe is displayed on the upper one of the two screens, and the screen can be scrolled with a gesture, as described above. A home screen on which a plurality of icons are arranged is displayed on the lower one of the two screens. The user can launch an application associated with an icon on the lower screen by touching the icon. In the present disclosure, a touch operation (contact operation) by the user on the touch panel display is simply referred to as a touch. The touch encompasses various actions, such as a tap, double tap, long tap (press and hold), slide, and the like.

(Method for Detecting Gesture by Proximity Sensor)

Figure 3:
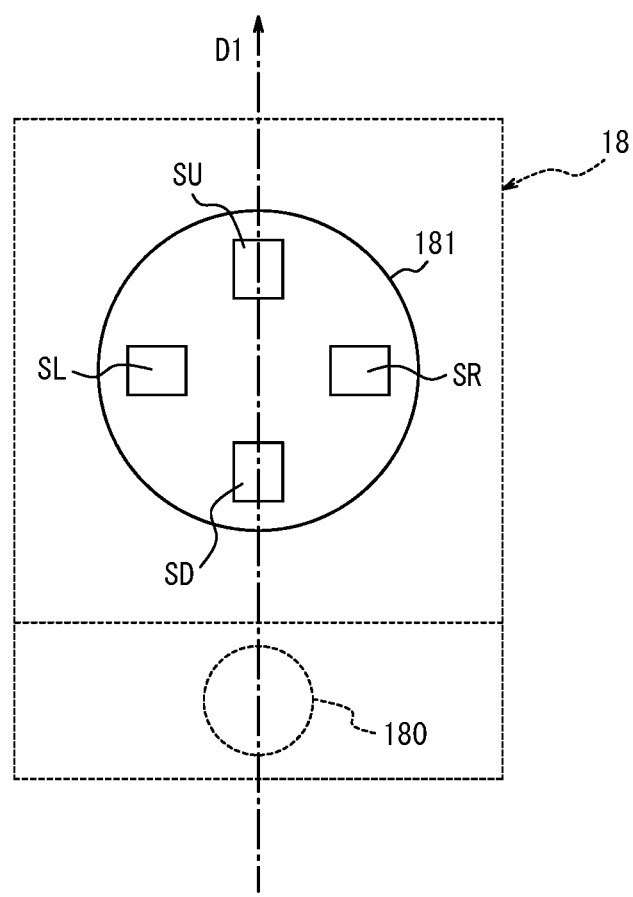
FIG. 3 is a configuration diagram of a proximity sensor.

A method performed by the controller 11 to detect a gesture by the user based on output of the proximity sensor 18 is described below in detail with reference to FIGS. 3 and 4. FIG. 3 illustrates an example configuration of the proximity sensor 18 when the electronic device 1 is viewed from the front. The proximity sensor 18 includes an infrared LED 180 acting as a light source and four infrared photodiodes SU, SR, SD, SL. The four infrared photodiodes SU, SR, SD, SL detect reflected light from a detection target through a lens 181. The four infrared photodiodes SU, SR, SD, SL are arranged symmetrically around the center of the lens 181. The infrared photodiode SU and the infrared photodiode SD are placed apart on an imaginary line D1 in FIG. 3. The infrared photodiodes SR and SL are placed between the infrared photodiode SU and the infrared photodiode SD in the direction of the imaginary line D1 illustrated in FIG. 3.

Figure 4:
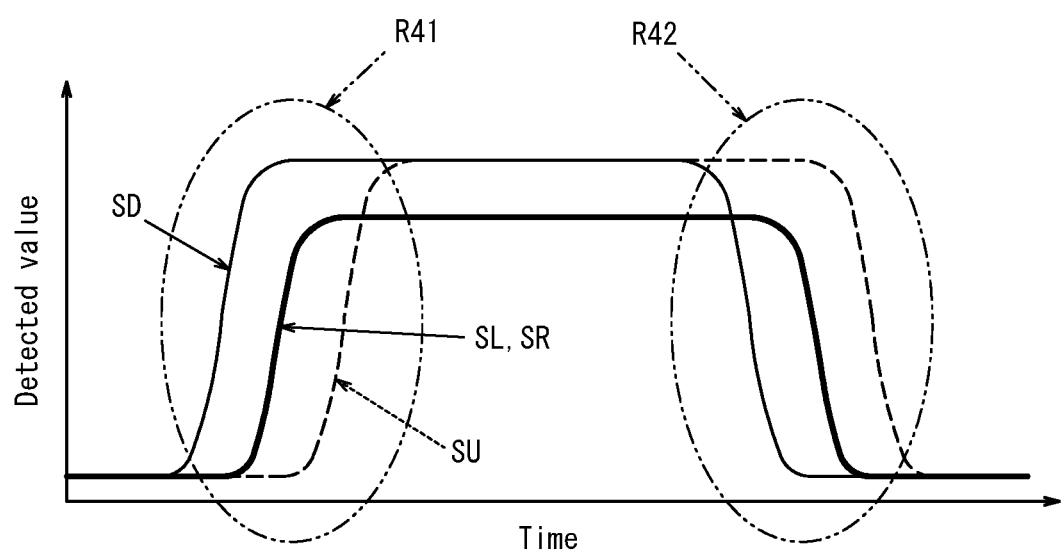
FIG. 4 illustrates the change over time in the value detected by each infrared photodiode.

FIG. 4 illustrates the change over time in the value detected by the four infrared photodiodes SU, SR, SD, SL as the detection target (for example, the user's hand) moves in the direction of the imaginary line D1 illustrated in FIG. 3. The infrared photodiode SD and the infrared photodiode SU are separated the most in the direction of the imaginary line D1 illustrated in FIG. 3. Hence, as illustrated in FIG. 4, the time difference is greatest between the change (for example, increase) in the value detected by the infrared photodiode SD (thin, solid line) and the same change (for example, increase) in the value detected by the infrared photodiode SU (dashed line). By recognizing a predetermined time difference in the change in the values detected by the photodiodes SU, SR, SD, SL, the controller 11 can judge the movement direction of the detection target.

The controller 11 acquires the values detected by the photodiodes SU, SR, SD, SL from the proximity sensor 18. To recognize movement by the detection target in the direction of the imaginary line D1, for example, the controller 11 may integrate the result of subtracting the value detected by the photodiode SU from the value detected by the photodiode SD over a predetermined time. In the example in FIG. 4, the integral value in regions R41 and R42 is non-zero. From the change in the integral value (for example, a positive, zero, or negative change), the controller 11 can recognize movement of the detection target in the direction of the imaginary line D1.

The controller 11 may also integrate the result of subtracting the value detected by the photodiode SR from the value detected by the photodiode SL over a predetermined time. From the change in the integral value (for example, a positive, zero, or negative change), the controller 11 can recognize movement of the detection target in a direction orthogonal to the imaginary line D1.

Alternatively, the controller 11 may perform calculations using all of the detected values of the photodiodes SU, SR, SD, SL. In other words, the controller 11 may recognize the movement direction of the detection target without performing calculations after division into components in the direction of the imaginary line D1 and the orthogonal direction thereto.

The gesture detected by the proximity sensor 18 may be a left or right gesture, an up or down gesture, a diagonal gesture, a gesture to trace a circle clockwise, a gesture to trace a circle counterclockwise, or other such gesture. The left or right gesture is, for example, performed in a direction substantially parallel to the transverse direction of the electronic device 1 illustrated in FIG. 2. The up or down gesture is, for example, performed in a direction substantially parallel to the longitudinal direction of the electronic device 1 illustrated in FIG. 2. The diagonal gesture is performed in a plane substantially parallel to the electronic device 1 illustrated in FIG. 2, in a direction not parallel to either the longitudinal direction or the transverse direction of the electronic device 1.

The photodiodes SU, SR, SD, SL can receive reflected light that is a reflection by the detection target of infrared light irradiated by the infrared LED 180 acting as a light source and can output a detected value of a magnitude corresponding to the amount of received light. At this time, the controller 11 can judge whether the detection target has moved closer to or farther away from the proximity sensor 18. First, the controller 11 can judge that the detection target is present when at least one detection value of the photodiodes SU, SR, SD, SL is equal to or greater than a threshold (for example, a value other than zero). After judging that the detection target is present, the controller 11 can judge that the detection target is moving closer to the electronic device 1 when at least one detection value of the photodiodes SU, SR, SD, SL becomes relatively large. After judging that the detection target is present, the controller 11 can judge that the detection target is moving away from the electronic device 1 when at least one detection value of the photodiodes SU, SR, SD, SL becomes relatively small. At this time, the controller 11 can distinguish a gesture by the user to move a hand towards the electronic device 1, a gesture to move a hand away, and a gesture that combines these gestures with the aforementioned other gestures (such as a left or right gesture).

As described above, the electronic device 1 according to an embodiment includes a first sensor (gesture sensor), such as the proximity sensor 18, that detects a gesture that does not come into contact with the electronic device 1. The first sensor may be capable of measuring the distance to the gesture detected by the first sensor. Even if the first sensor cannot measure the distance to the gesture, the controller 11 may estimate the distance to the gesture based on the gesture detected by the first sensor. As described above, the electronic device 1 according to an embodiment also includes a second sensor (touch sensor), such as the touch sensor 26 (touch panel display/touchscreen display), that detects a touch on the electronic device 1. The sensor that detects a gesture that does not come into contact with the electronic device 1, such as the proximity sensor 18, is referred to below as the first sensor or the gesture sensor as appropriate. The sensor that detects a touch on the electronic device 1, such as the touch sensor 26, is referred to below as the second sensor or the touch sensor as appropriate.

(Kitchen Mode)

Figure 5:
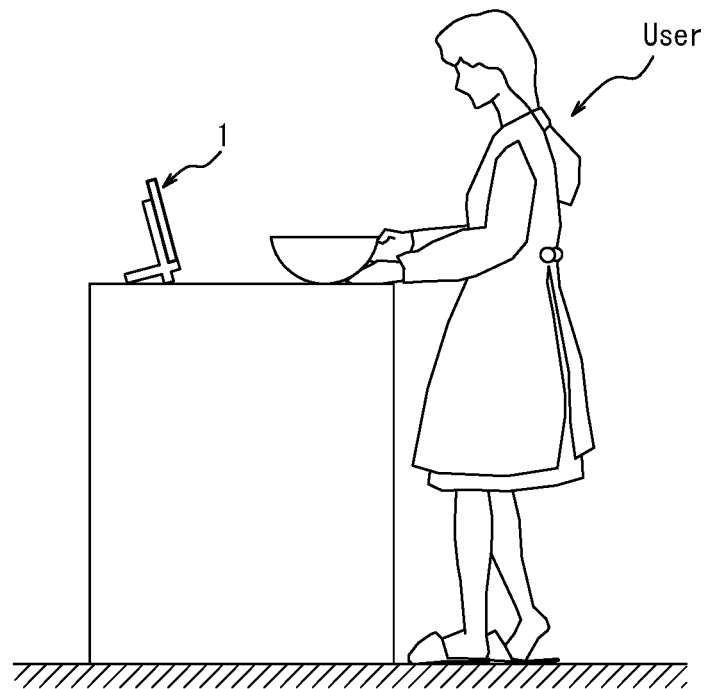
FIG. 5 illustrates an example of conditions in which an electronic device is operated with a gesture.

FIG. 5 illustrates example conditions in which the user operates the electronic device 1 with a gesture. In the example in FIG. 5, the user is cooking in the kitchen by following a cooking recipe displayed on the display 14 of the electronic device 1. The proximity sensor 18 detects a gesture by the user in the example in FIG. 5. The controller 11 executes processing based on the gesture detected by the proximity sensor 18. For example, the controller 11 can execute processing to scroll the recipe in response to a particular gesture (such as the user moving the hand up or down). The user's hand may become dirty or wet during cooking. The user can scroll the recipe, however, without touching the electronic device 1. The display 14 therefore does not become dirty, and dirt on the display 14 can be prevented from getting on the user's hand during cooking.

The electronic device 1 may have a plurality of modes. Modes refer to operation modes (operation states or operation statuses) that, for example, place restrictions on the operations of the entire electronic device 1. The modes may be operation modes that add predetermined functions to the operations of the electronic device 1 or remove restrictions related to predetermined functions. The electronic device 1 may be configured for selection of only one mode at a time. In the present embodiment, the modes of the electronic device 1 may include a first mode and a second mode, for example.

The first mode is a regular operation mode (regular mode) appropriate for use in circumstances other than when cooking in the kitchen, for example. The circumstances other than when cooking in the kitchen may, for example, include a state in which a cooking recipe is not displayed on the smartphone or a state in which an application for displaying cooking recipes on the smartphone is not running (in the foreground). Here, other applications may be running in the foreground or the background when an application for displaying cooking recipes on the smartphone is not running (in the foreground). The mode of the electronic device 1 may be the first mode (regular mode) in such states. During the regular state of standby for a phone call on the smartphone or the sleep state of the smartphone, for example, the mode of the electronic device 1 may be the first mode (regular mode).

The second mode may be an operation mode (kitchen mode) of the electronic device 1 that is optimal for cooking in the kitchen while a recipe is displayed.

As described above, input by gesture is preferably possible in the second mode. In other words, when the mode of the electronic device 1 switches to the second mode, the proximity sensor 18 may operate in accordance with the switching to allow detection of a gesture. The mode of the electronic device 1 may be switched based on a predetermined input operation by the user on the electronic device 1, the launching of a predetermined application, or the like.

Various other modes may be set in the electronic device 1 other than the above-described modes. For example, a mode in which predetermined functions are activated may be set as the first mode, and modes other than the first mode may be the second mode. In this case, the second mode may be the "regular mode", for example.

In the electronic device 1, a mode for detecting a gesture with the proximity sensor 18, without contact on the electronic device 1, and a mode for detecting a touch on the electronic device 1 with the touch sensor 26 may be set. In this case, the electronic device 1 may operate by switching between these modes exclusively or may have a temporal overlap between at least a portion of these modes.

Furthermore, at least one of a mode for detecting only the above-described gestures, a mode for detecting only the above-described touch, and a mode for detecting both the above-described gestures and touch may be set on the electronic device 1.

(Car Mode)

Figure 6:
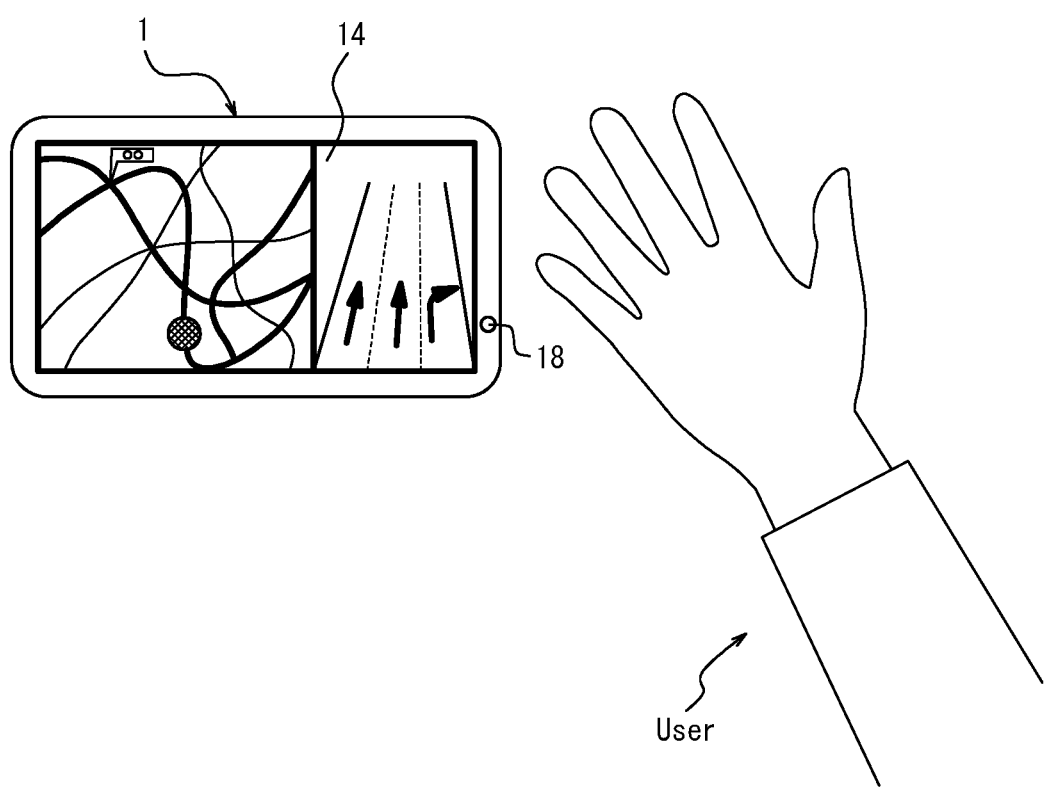
FIG. 6 illustrates a user operating an electronic device with a gesture.

FIG. 6 illustrates the user operating the electronic device 1 with a gesture while the electronic device 1 is in car mode. In FIG. 6, the electronic device 1 is attached to the console of the car, for example. Alternatively, the electronic device 1 may be supported by a support provided inside the car. The support may be installed on the dashboard. As illustrated in FIG. 6, the electronic device 1 in car mode may be used while sideways (so that the longitudinal direction is in the left-right direction). Upon the proximity sensor 18 detecting a gesture by the user, the controller 11 executes processing based on the detected gesture. The gesture-based processing in the example in FIG. 6 may be movement of the screen on which a wide area map is displayed. When the user makes a gesture by moving a hand to the left in the longitudinal direction of the electronic device 1, for example, the screen moves to the left in accordance with the movement of the user's hand. The correspondence between the direction of the gesture by which the user moves the hand and the direction in which the screen moves can be set freely. For example, the screen may move to the right instead of to the left when the user performs a gesture to move the hand to the left.

As described above, the electronic device 1 illustrated in FIG. 6 may be a smartphone that can be installed in and removed from the console. The electronic device 1 may, as another example, be a car navigation apparatus installed in the vehicle. In this case, the modes of the electronic device 1 need not include the second mode.

Here as well, the electronic device 1 may have a plurality of modes. In this case, the first mode may be a regular operation mode (regular mode) suitable for use in circumstances other than diving, for example. Circumstances other than driving may, for example, include any of a state in which the car engine is not on, a state in which the shift lever is in a predetermined range (such as a parking range), a state in which the brake pedal is depressed, and a state in which the path to the destination is not being displayed. The second mode may be an operation mode (car mode) of the electronic device 1 suitable for driving of the vehicle while the path to the destination is displayed on the display 14 of the electronic device 1.

When the electronic device 1 is in kitchen mode or in car mode, the user can operate the electronic device 1 using at least one of a gesture and a touch. The electronic device 1 of the present disclosure can associate a gesture or a touch with the processing described below, which can improve operability when the user performs an input operation.

Next, the operations of the electronic device 1 according to an embodiment are described.

When the electronic device 1 is a device such as a smartphone, the "user" of the electronic device 1 is typically the user of the electronic device 1, such as the owner of the electronic device 1. The user of the electronic device 1 is not, however, limited to the owner of the electronic device 1 and may be a person who operates the electronic device 1 other than the owner of the electronic device 1. The electronic device 1 may identify the user who provides gesture-based input and/or touch-based input. In this case, the electronic device 1 may execute different processing in accordance with the user who provides gesture-based input and/or touch-based input.

When the electronic device 1 is used in digital signage, the "user" of the electronic device 1 need not be the owner of the electronic device 1. In this case, a passerby near the electronic device 1, for example, can become the user of the electronic device 1. When the electronic device 1 is used in digital signage, a person who does not initially operate the electronic device 1 may become the "user" by seeing the display on the display 14, approaching the electronic device 1, and beginning to operate the electronic device 1.

The "user" of the electronic device 1 may, for example, be the driver of a car in which the electronic device 1 is mounted. The user of the electronic device 1 is not, however, limited to the driver of the car in which the electronic device 1 is mounted and may be another person, other than the driver, riding in the car in which the electronic device 1 is mounted. The electronic device 1 may judge whether the user who provides gesture-based input and/or touch-based input is the driver. In this case, the electronic device 1 may execute different processing depending on whether the user who provides gesture-based input and/or touch-based input is the driver.

Figure 7:
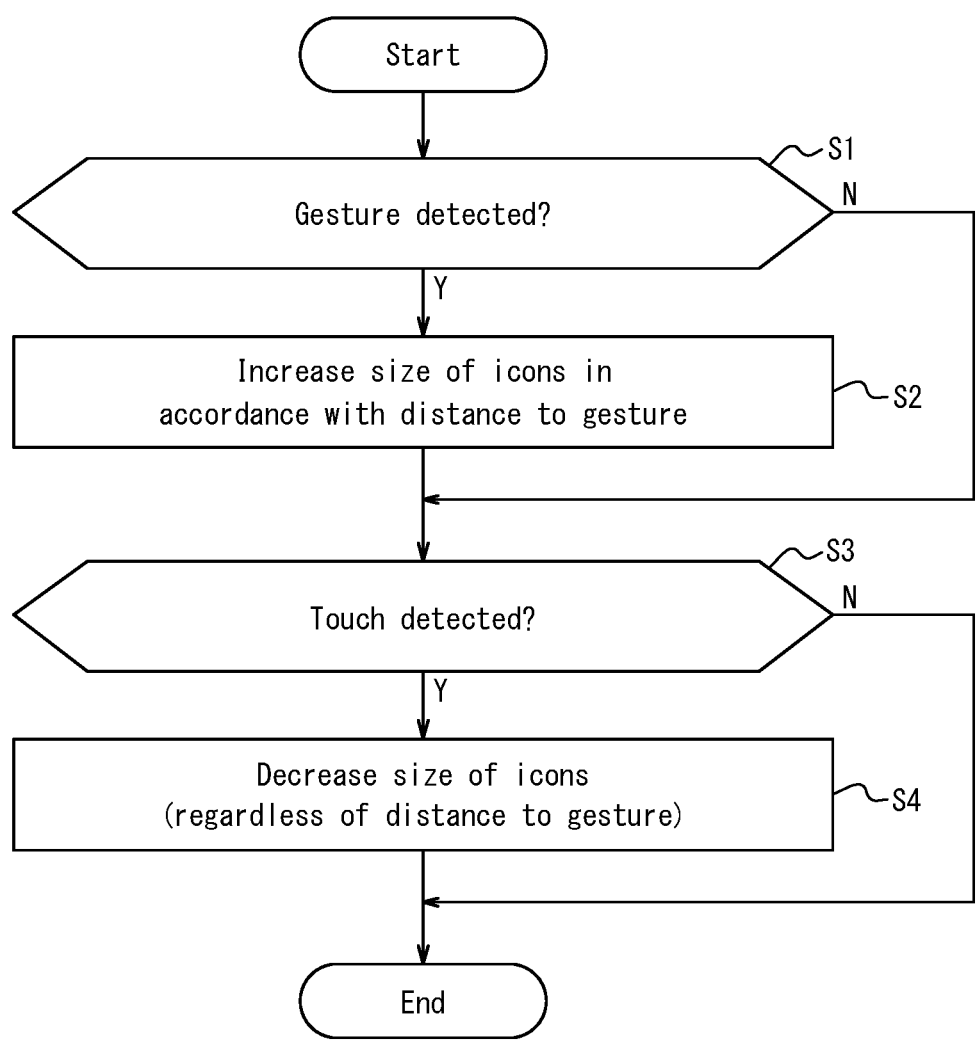
FIG. 7 is a flowchart illustrating an example of processing executed by a controller of an electronic device.

FIG. 7 is a flowchart illustrating an example of processing executed by the controller 11 of the electronic device 1 according to an embodiment.

Figure 8:
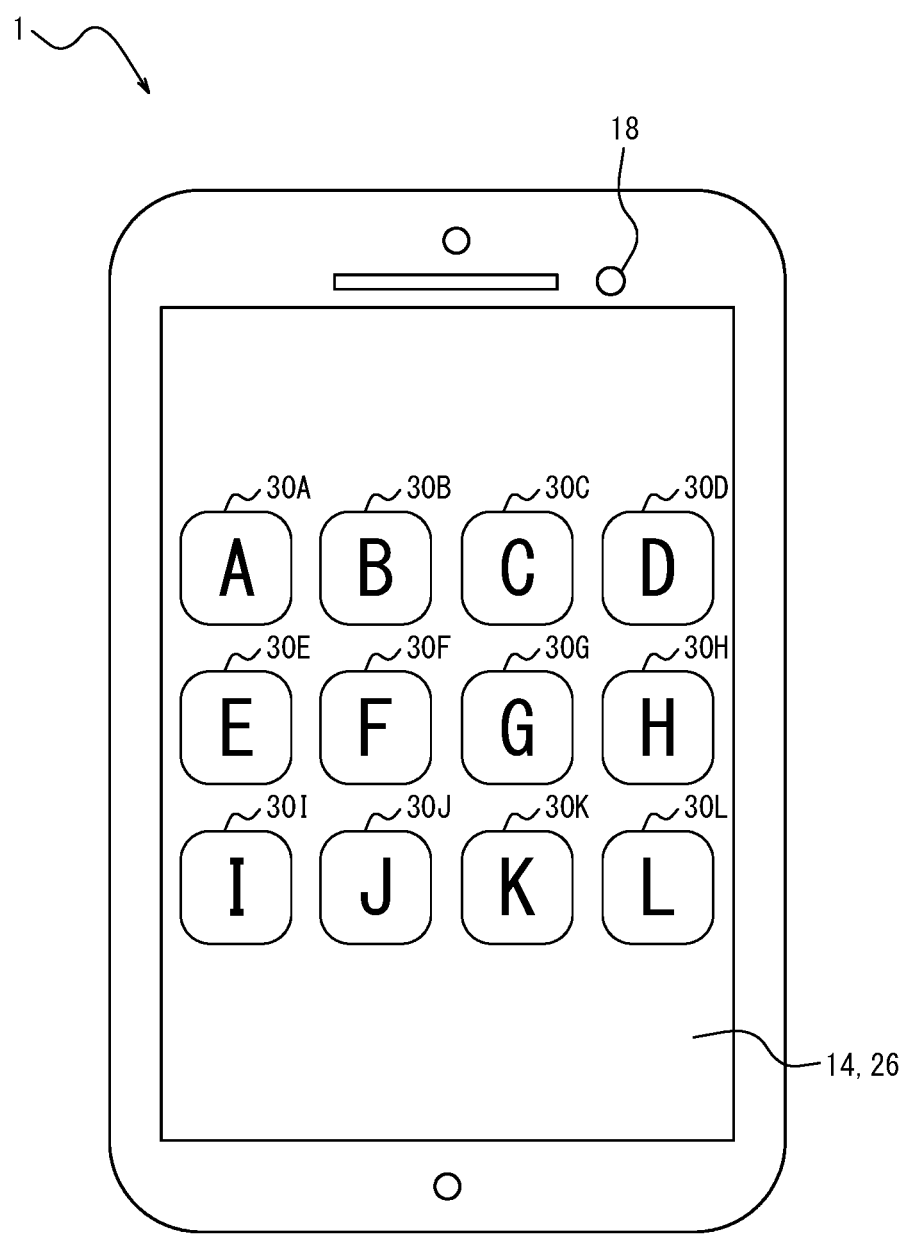
FIG. 8 illustrates an example display screen of an electronic device.

Before the processing in FIG. 7 starts, the controller 11 may display a screen such as the one illustrated in FIG. 8 on the display 14. FIG. 8 illustrates a state in the electronic device 1 in which icons 30A to 30L are displayed on the display 14. In FIG. 8, 12 icons from icons 30A to 30L are displayed as an example. The controller 11 may display any number of icons on the display 14 in an embodiment, however. The icons 30A to 30L are referred to below simply as "icons 30" when no distinction therebetween is made.

In response to a touch operation by the user on one of the icons 30, the controller 11 performs an action associated with that icon 30. The touch operation by the user on an icon 30 can be detected by the touch sensor 26. The action associated with each icon 30 may be any of various actions. For example, the controller 11 may launch an application associated with a predetermined icon 30 in response to a touch operation by the user on the predetermined icon 30. As described above, the touch may encompass various actions, such as a tap, double tap, long tap (press and hold), slide, and the like.

When the processing in FIG. 7 begins, the controller 11 judges whether the proximity sensor 18 (gesture sensor) has detected a gesture by the user (step S1). In step S1, the controller 11 may judge whether a particular gesture has been detected by the proximity sensor 18. The controller 11 may also judge in step S1 whether an arbitrary gesture has been detected by the proximity sensor 18.

If a gesture is detected in step S1, the controller 11 increases the size of the icons 30 displayed on the display 14 in accordance with the distance to the gesture (step S2). The processing in step S2 is performed based on the distance between the position where the user performed the gesture and the electronic device 1. Here, the distance from the electronic device 1 to the position where a gesture is detected by the proximity sensor 18 can be detected by the proximity sensor 18 when, for example, the proximity sensor 18 also functions as a ranging sensor. It is also envisioned that the distance can be estimated from an image captured by the camera 13, for example. In this case, the distance from the electronic device 1 to the position where a gesture is detected by the proximity sensor 18 may, for example, be estimated by the controller 11 based on an image captured by the camera 13.

Figure 9:
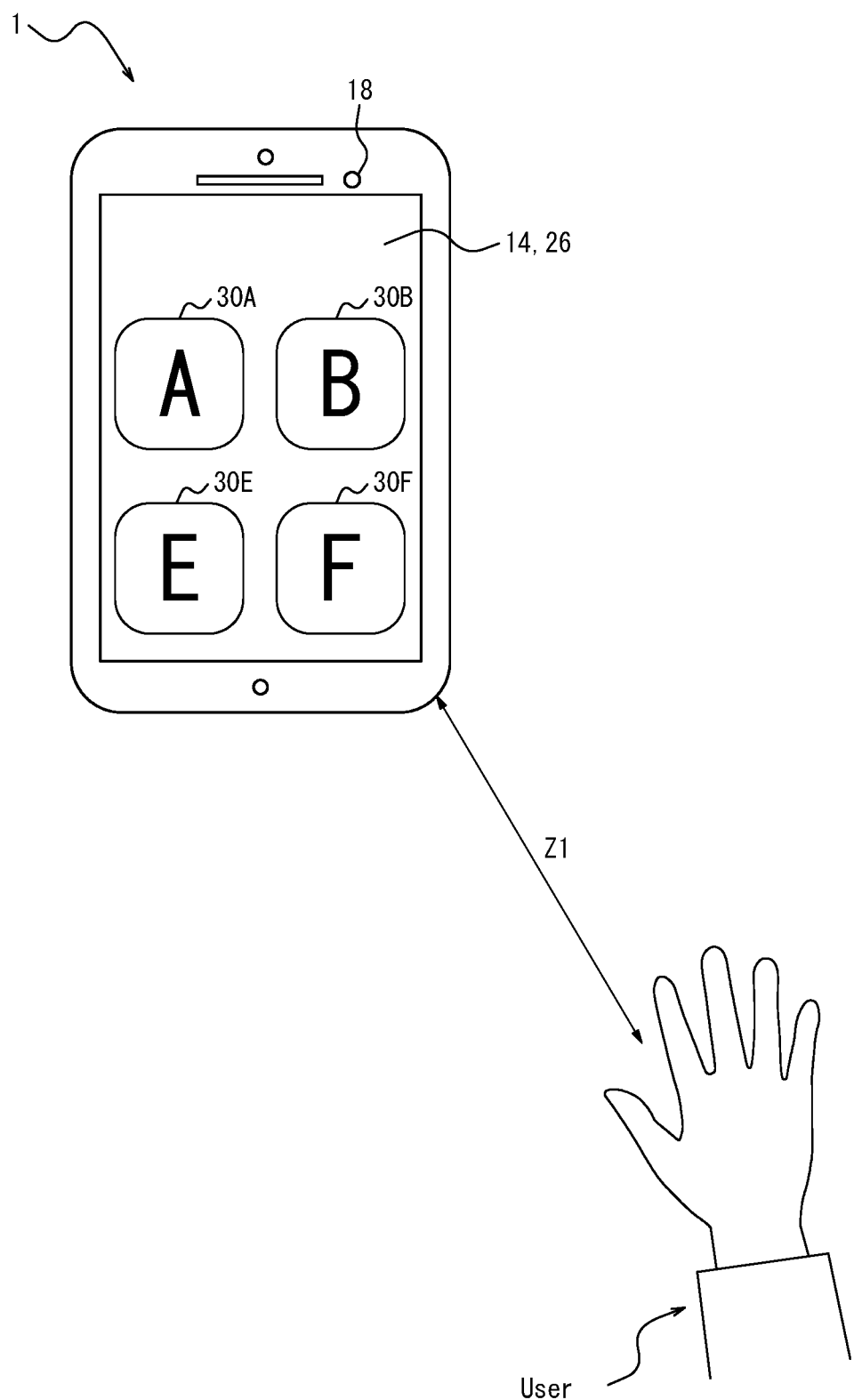
FIG. 9 illustrates a user operating an electronic device with a gesture.

FIG. 9 illustrates an example of the user operating the electronic device 1 with a gesture. FIG. 9 illustrates the state when the gesture by the user is detected by the proximity sensor 18. As illustrated in FIG. 9, the distance from the electronic device 1 to the position where the gesture was performed when the gesture was detected by the proximity sensor 18 is assumed to be Z1. In this case, the controller 11 increases the size of the icons 30 displayed on the display 14 in accordance with the distance Z1. The icons 30 illustrated in FIG. 9 are displayed at a greater size on the display 14 than the icons 30 illustrated in FIG. 8. Here, the correlation between the distance Z1 and the size with which the icons 30 are displayed may be set freely. The correlation set in this way may, for example, be stored in advance in the storage 16 or the like or may be acquired as appropriate via the communication interface 17 or the like.

The correlation between the distance Z1 and the size with which the icons 30 are displayed may, for example, be such that the size of the displayed icons 30 increases as Z1 grows longer, for example. Specifically, when the distance Z1 doubles, for example, the size with which the icons 30 are displayed may also double. When the distance Z1 doubles, for example, at least one of the height and the width of the icons 30 may double. When the distance Z1 doubles, for example, the area of the icons 30 may double.

Figure 10:
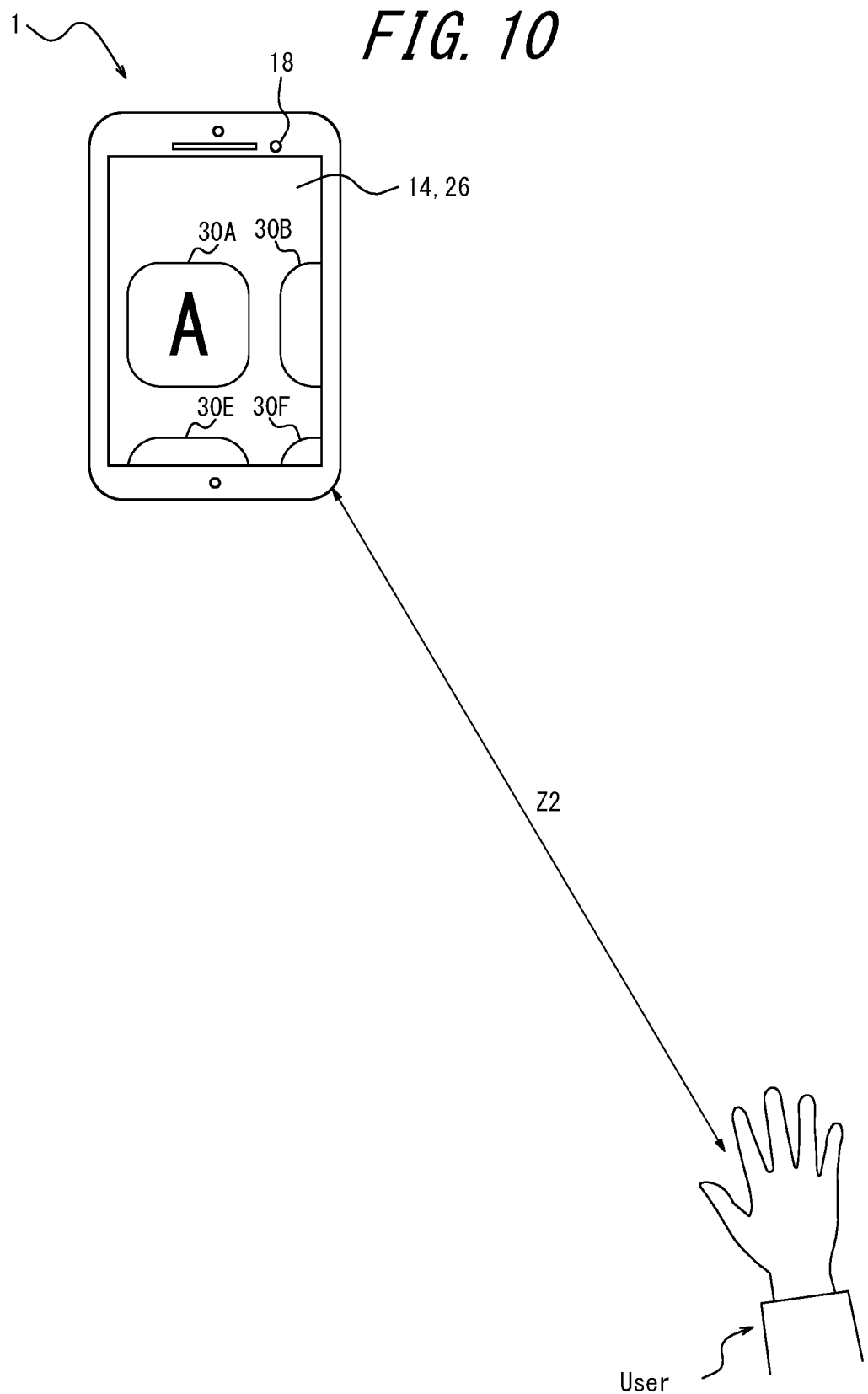
FIG. 10 illustrates a user operating an electronic device with a gesture.

FIG. 10 illustrates an example of the user operating the electronic device 1 with a gesture. FIG. 10 illustrates the state when the gesture by the user is detected by the proximity sensor 18, like FIG. 9. As illustrated in FIG. 10, the distance from the electronic device 1 to the position where the gesture was performed when the gesture was detected by the proximity sensor 18 is assumed to be Z2 (where Z2>Z1). In this case, the controller 11 increases the size of the icons 30 displayed on the display 14 in accordance with the distance Z2. The icons 30 illustrated in FIG. 10 are displayed at an even greater size on the display 14 than the icons 30 illustrated in FIG. 9.

In the example illustrated in FIG. 10, the controller 11 increases not only the size of the icon 30A displayed on the display 14, but also the size of other icons 30, such as the icon 30B, in accordance with the distance Z2. In an embodiment, however, the controller 11 may increase only the size of the icon 30A displayed on the display 14, for example, without increasing the size of other icons 30, such as the icon 30B. When the icon 30A is selected, the controller 11 may, for example, increase the size of only the icon 30A in accordance with the distance Z2.

In the electronic device 1 according to an embodiment, the controller 11 thus increases the size of an icon displayed on the display 14 when a gesture is detected by the proximity sensor 18. In this case, the controller 11 may increase the size of the icon displayed on the display 14 in accordance with the distance to the position where the gesture detected by the proximity sensor 18 is performed. The controller 11 may, in this case, increase the size of the icon displayed on the display 14 as the distance to the position where the gesture detected by the proximity sensor 18 is performed becomes longer.

When the size of the icon is increased in step S2, the controller 11 performs the processing of step S3. The controller 11 also performs the processing of step S3 when a gesture is not detected in step S1.

In step S3, the controller 11 judges whether or not a touch by the user has been detected by the touch sensor 26 (step S3). In step S3, the controller 11 may judge whether a particular touch has been detected by the touch sensor 26. The controller 11 may also judge in step S3 whether an arbitrary gesture has been detected by the touch sensor 26.

When a touch is detected in step S3, the controller 11 decreases the size of the icons 30 displayed on the display 14 regardless of the distance to the gesture (step S4). In step S4, processing is performed regardless of the distance between the position where the user performed the gesture and the electronic device 1. In other words, even when a gesture by the user is detected by the proximity sensor 18, processing is performed to decrease the size of the icons 30 displayed on the display 14 in step S4.

Figure 11:
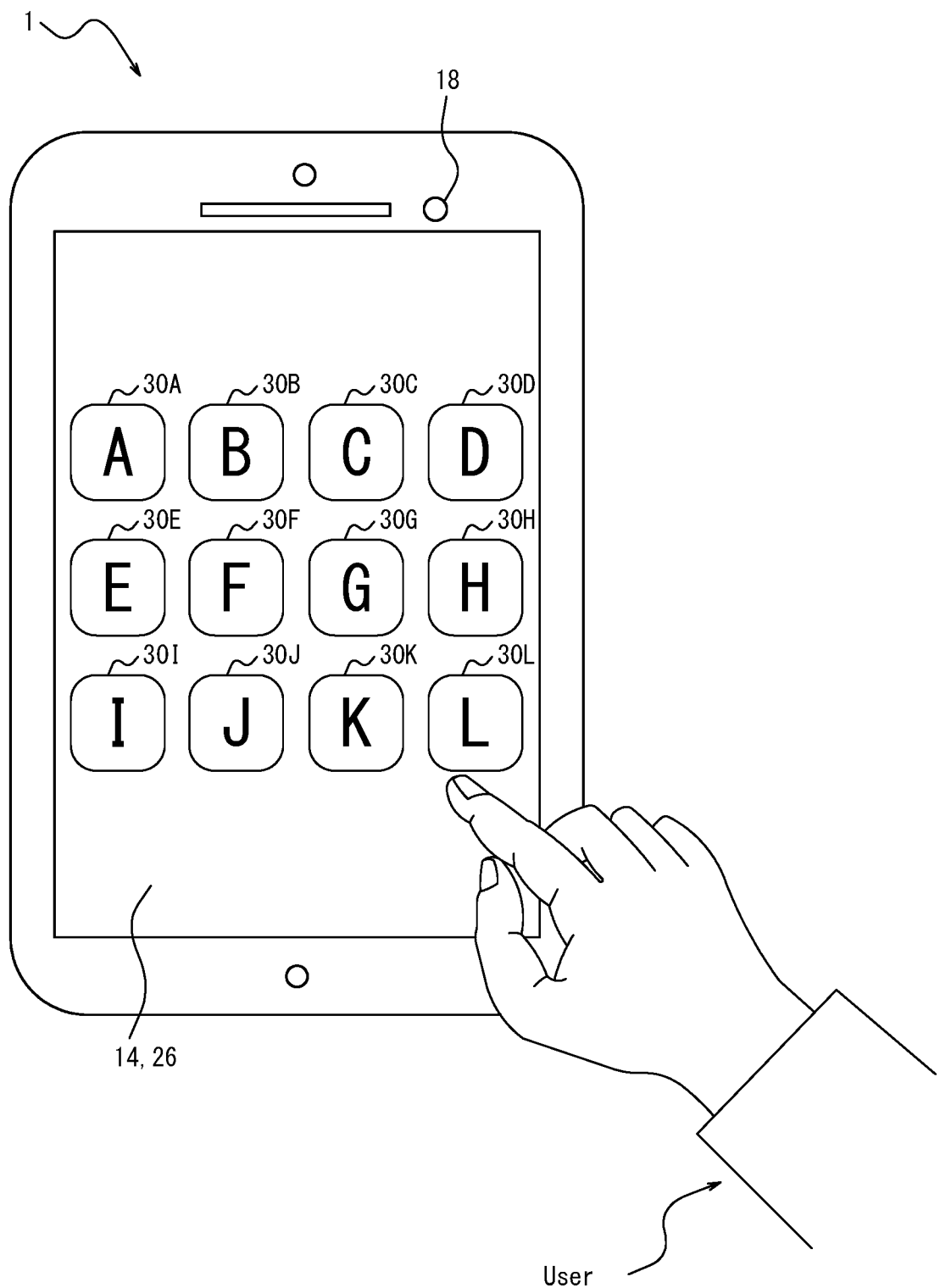
FIG. 11 illustrates a user operating an electronic device by touch.

FIG. 11 illustrates a user operating the electronic device 1 by touch. FIG. 11 illustrates the state when a touch by (a finger of) the user is detected by the touch sensor 26. When a touch is detected by the touch sensor 26, the size of the icons 30 displayed on the display 14 is reduced regardless of the distance to the position where a user gesture is detected by the proximity sensor 18, as illustrated in FIG. 11. The icons 30 illustrated in FIG. 11 are displayed at a smaller size on the display 14 than the icons 30 illustrated in FIGS. 9 and 10. The smaller size at which the icons 30 are displayed when a touch is detected may be set freely. The size set in this way may, for example, be stored in advance in the storage 16 or the like or may be acquired as appropriate via the communication interface 17 or the like.

The size of the icons 30 in FIG. 11 is the same as the size of the icons 30 in FIG. 8, i.e. the size of the icons 30 before the size was increased (original size). In step S4, the controller 11 may thus reduce the size of the icons 30, increased in step S2, to the size before the increase. In other words, the controller 11 may reduce the size of the icons 30 displayed on the display 14 to the original size in step S4. When reducing the size of the icons 30 displayed on the display 14 in step S4, the controller 11 may instead make the icons 30 smaller or larger than the original size.

The icons 30 that the controller 11 reduces in size and displays on the display 14 in step S4 may be only the icons 30 that were increased in size in step S2. The controller 11 may also reduce all of the icons 30 displayed on the display 14 in size in step S4.

In this way, the controller 11 in the electronic device 1 according to an embodiment decreases the size of icons displayed on the display 14 when a touch is detected by the touch sensor 26, regardless of the distance to the position where a gesture is detected by the proximity sensor 18. In other words, when a touch is detected by the touch sensor 26, the controller 11 decreases the size of the icons displayed on the display 14, even if a gesture had been detected by the proximity sensor 18. Furthermore, when a touch is detected by the touch sensor 26, the controller 11 may decrease the size of icons, displayed on the display 14, that had been increased.

In the electronic device 1 according to an embodiment, the size of the icons 30 displayed on the display 14 increases as a user gesture is detected farther away from the electronic device 1. This makes it easier for the user to recognize the icons 30 displayed on the display 14 when the user is at a distance from the electronic device 1. The operability of the electronic device 1 according to an embodiment is thereby improved. Furthermore, when a touch by the user is detected, the icons 30 displayed on the display 14 are decreased in size with the electronic device 1 according to an embodiment. Therefore, the user can display and operate multiple icons 30 on the display 14 when performing a touch operation on the electronic device 1. The operability of the electronic device 1 according to an embodiment is thereby improved.

After completion of the processing in FIG. 7, the controller 11 may start the processing in FIG. 7 again immediately or at predetermined time intervals. In this case, the controller 11 may repeat the processing in FIG. 7 and increase the size of the icons displayed on the display 14 as the distance from the electronic device 1 to the position where a gesture is performed grows longer. In this case as well, the size of icons displayed on the display 14 may be decreased when a touch by the user is detected once by the touch sensor 26.

In recent years, information transmission technology such as digital signage has been attracting attention. The electronic device 1 according to an embodiment not only can present various information to people around the electronic device 1 but also can change the presented information in response to a touch or gesture by the user. The electronic device 1 according to an embodiment can therefore achieve interactive digital signage that can differ for individual users.

Figure 12:
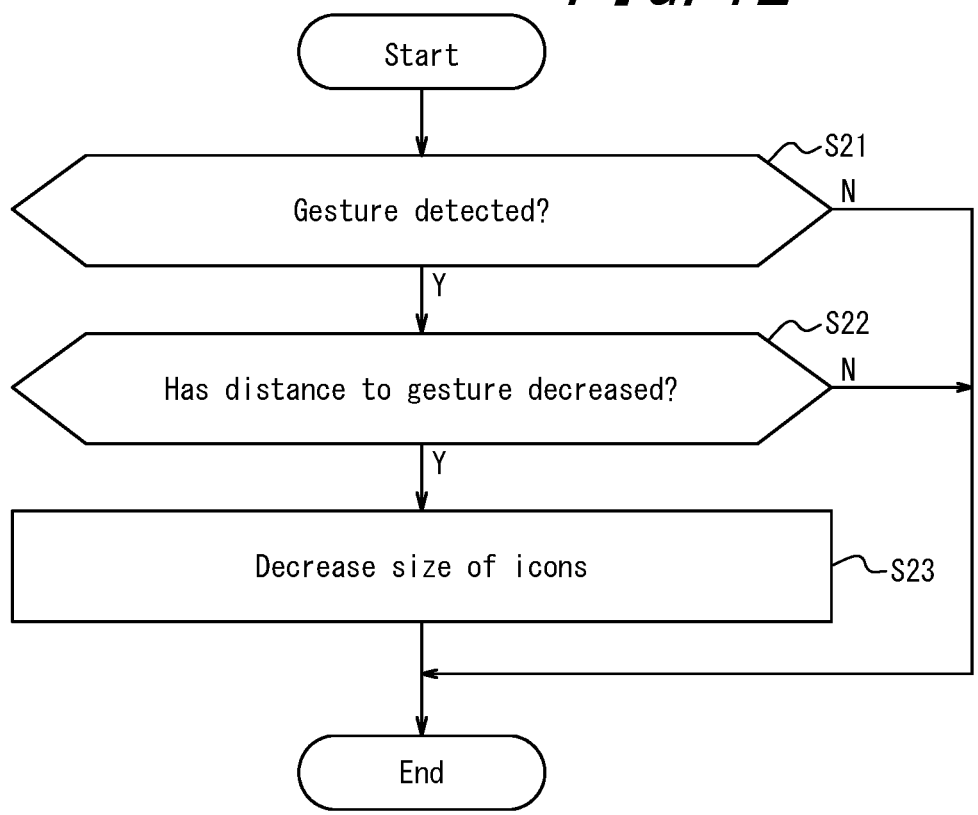
FIG. 12 is a flowchart illustrating an example of processing executed by a controller of an electronic device.

FIG. 12 is a flowchart illustrating another example of processing executed by the controller 11 of the electronic device 1 according to an embodiment. The processing in FIG. 12 can be executed following the processing described in FIG. 7.

After the icons are displayed with a greater size by the processing in FIG. 7, the processing in FIG. 12 decreases the size of the icons displayed on the display 14 as the distance to the position where a subsequently detected gesture is performed grows shorter.

When the processing in FIG. 12 begins, the controller 11 judges whether a gesture by the user has been detected by the proximity sensor 18 (step S21). The controller 11 may perform similar processing as step S1 of FIG. 7 in step S21. In other words, the controller 11 may judge in step S21 whether a particular gesture has been detected by the proximity sensor 18. The controller 11 may also judge in step S21 whether an arbitrary gesture has been detected by the proximity sensor 18. When a gesture is not detected in step S21, the controller 11 ends the processing in FIG. 7.

On the other hand, when a gesture is detected in step S21, the controller 11 judges whether the distance from the electronic device 1 to the position where the gesture is detected by the proximity sensor 18 is shorter than the distance detected in step S1 (step S22). In other words, the controller 11 judges in step S22 whether the distance detected in step S21 is shorter than the distance detected in step S1. The controller 11 thus judges in step S22 whether the distance to the detected gesture has grown shorter.

When the distance to the gesture in step S22 is not shorter, the controller 11 ends the processing in FIG. 12. Conversely, when the distance to the gesture in step S22 is shorter, the controller 11 decreases the size of the icons 30 displayed on the display 14 (step S23).

For example, as illustrated in FIG. 10, the distance from the electronic device 1 to the position where the gesture was performed when the gesture was detected by the proximity sensor 18 is assumed to be Z2. Subsequently, as illustrated in FIG. 9, the distance from the electronic device 1 to the position where the gesture was performed when the gesture was detected by the proximity sensor 18 is assumed to be Z1 (where Z1<Z2). In this case, as illustrated in FIG. 9, the size of the icons 30 displayed on the display 14 decreases. The icons 30 illustrated in FIG. 9 are displayed at a smaller size on the display 14 than the icons 30 illustrated in FIG. 10. Here, the correlation between the decrease in the distance from the electronic device 1 to the position where the gesture was performed and the size with which the icons 30 are displayed may be set freely. The correlation set in this way may, for example, be stored in advance in the storage 16 or the like or may be acquired as appropriate via the communication interface 17 or the like.

The correlation between the decrease in the distance from the electronic device 1 to the position where the gesture was performed and the size with which the icons 30 are displayed may, for example, be such that the size of the displayed icons 30 decreases as the distance decreases. Specifically, when the distance is halved, for example, the size with which the icons 30 are displayed may also be halved. When the distance is halved, for example, at least one of the height and the width of the icons 30 may be halved. When the distance is halved, for example, the area of the icons 30 may be halved.

After a gesture is detected by the proximity sensor 18 and the icons displayed on the display 14 are increased in size in this way, the controller 11 in the electronic device 1 according to an embodiment may execute processing such as the following. Specifically, the controller 11 may decrease the increased size of the icons displayed on the display 14 as the distance to the position where a gesture is detected by the proximity sensor 18 grows shorter.

With the electronic device 1 according to an embodiment, the size of icons 30 displayed on the display 14 decreases as the position where a gesture by the user is detected approaches the electronic device 1. Therefore, the user can display and operate multiple icons 30 on the display 14 when performing a gesture on the electronic device 1. The operability of the electronic device 1 according to an embodiment is thereby improved.

Figure 13:
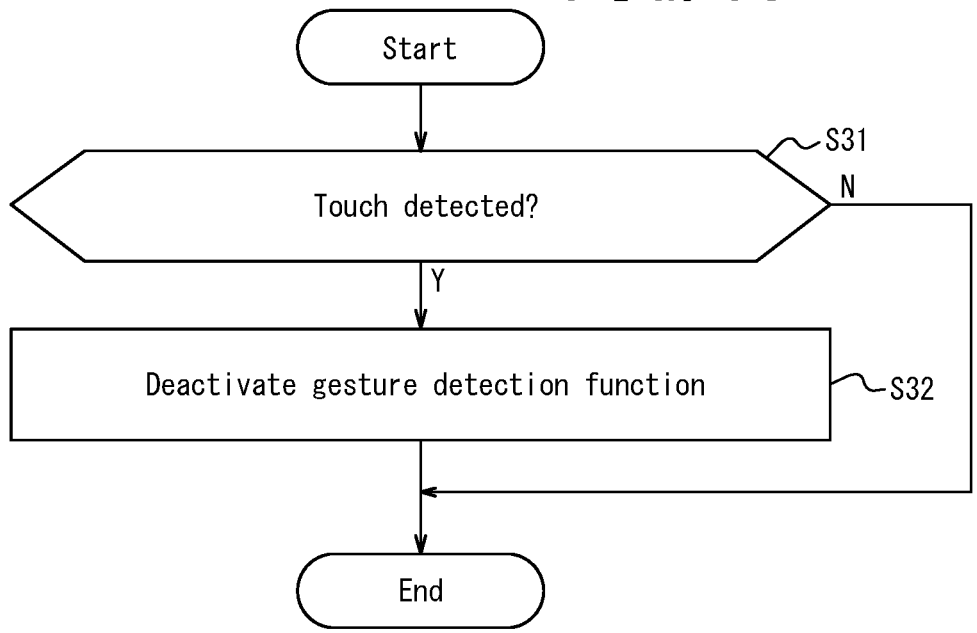
FIG. 13 is a flowchart illustrating an example of processing executed by a controller of an electronic device.

FIG. 13 is a flowchart illustrating another example of processing executed by the controller 11 of the electronic device 1 according to an embodiment. The processing in FIG. 13 can be executed following the processing described in FIGS. 7 and 12. The processing in FIG. 14 may also be executed in parallel with the processing described in FIGS. 7 and 12.

Figure 14:
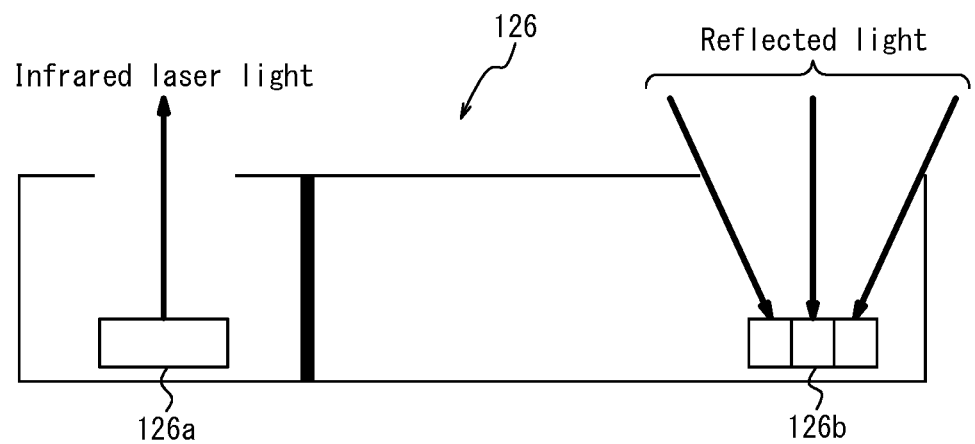
FIG. 14 schematically illustrates a ranging sensor.

When the processing in FIG. 14 begins, the controller 11 judges whether a touch by the user has been detected by the touch sensor 26 (step S31). The controller 11 may perform similar processing as step S3 of FIG. 7 in step S31. For example, in step S31, the controller 11 may judge whether a particular touch has been detected by the touch sensor 26. The controller 11 may also judge in step S31 whether an arbitrary gesture has been detected by the touch sensor 26.

When a touch is not detected in step S31, the controller 11 ends the processing in FIG. 13. Conversely, the controller 11 deactivates the gesture detection function by the proximity sensor 18 (gesture sensor) when a touch is detected in step S31 (step S32).

Deactivation of the gesture detection function in step S32 refers, for example, to deactivating the function to detect a user gesture using a gesture sensor such as the proximity sensor 18. Stating that the function to detect a user gesture using a gesture sensor is "deactivated" may refer to a state in which the sensor does not detect a predetermined gesture by the user. The supply of power to the gesture sensor, such as the proximity sensor 18, may be suspended in this case. Stating that the function to detect a user gesture using a gesture sensor is "deactivated" may also refer to a state in which the sensor detects a predetermined gesture by the user, but the controller 11 does not execute predetermined processing in response to the detection result. The predetermined gesture may refer to a particular gesture or an arbitrary gesture.

In this way, the electronic device 1 according to an embodiment may deactivate the detection function of the proximity sensor 18 when a touch is detected by the touch sensor 26. With the electronic device 1 according to an embodiment, user gestures are no longer detected when a touch by the user is detected. This avoids the problem of a gesture being mistakenly detected when the user performs a touch operation on the electronic device 1. The operability of the electronic device 1 according to an embodiment is thereby improved. Furthermore, when the user performs a touch operation on the electronic device 1 according to an embodiment, the electronic device 1 can reduce power consumption that would be necessary for the proximity sensor 18 and the like to detect a gesture.

Other Embodiments

Although the subject matter of the present disclosure has been described with reference to the drawings and embodiments, it is to be noted that various changes and modifications will be apparent to those skilled in the art based on the present disclosure. Therefore, such changes and modifications are to be understood as included within the scope of the present disclosure. For example, the functions and the like included in the various units, steps, and the like may be reordered in any logically consistent way. Furthermore, units, steps, and the like may be combined into one or divided.

In the above embodiment, gestures have been described as being detected by the proximity sensor 18, but gestures do not necessarily have to be detected by the proximity sensor 18. Gestures may be detected by any sensor capable of detecting a gesture by the user without contact on the electronic device 1. Examples of such sensors include the camera 13.

Examples of sensors that can detect a gesture by the user without contact on the electronic device 1 may, for example, include a ranging sensor. For example, the electronic device 1 may include a ranging sensor instead of or in addition to the proximity sensor 18 and may detect a gesture using the ranging sensor.

The ranging sensor is a sensor capable of measuring the distance to an object. The ranging sensor may, for example, be configured as a time of flight (ToF) sensor. The ranging sensor configured as a ToF sensor includes a light emitter that irradiates sinusoidal modulated light (infrared laser light) towards an object and a light receiver that receives reflected light, from the object, of the irradiated infrared laser light. The light receiver includes an image sensor in which a plurality of light-receiving elements are arranged, for example. The ToF sensor measures the time (time-of-flight) from when infrared laser light is irradiated until reflected light is received by the light-receiving elements. The ToF sensor can measure the time-of-flight based on the phase difference between the irradiated infrared laser light and the received reflected light. Based on the measured time-of-flight, the ToF sensor can measure the distance to the object that reflected the irradiated infrared laser light. The ToF sensor can detect the direction of movement of the object from the time difference between when reflected light from the object is incident on each of the light-receiving elements. With a principle similar to the principle described for the proximity sensor 18, the ToF sensor as well can therefore detect a gesture performed by the user. The ranging sensor may be provided on the same surface of the electronic device 1 as the proximity sensor 18, for example.

Figure 15:
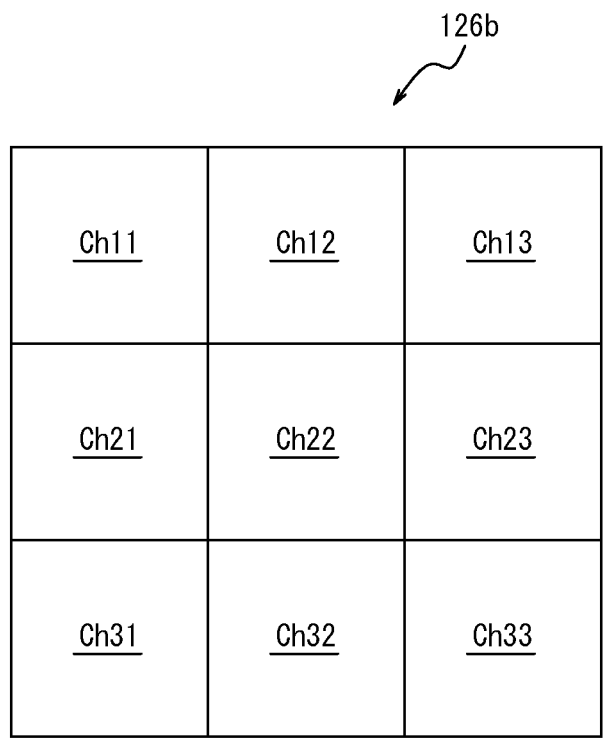
FIG. 15 schematically illustrates an example of arrangement of light-receiving elements in the light receiver illustrated in FIG. 14.
Figure 16:
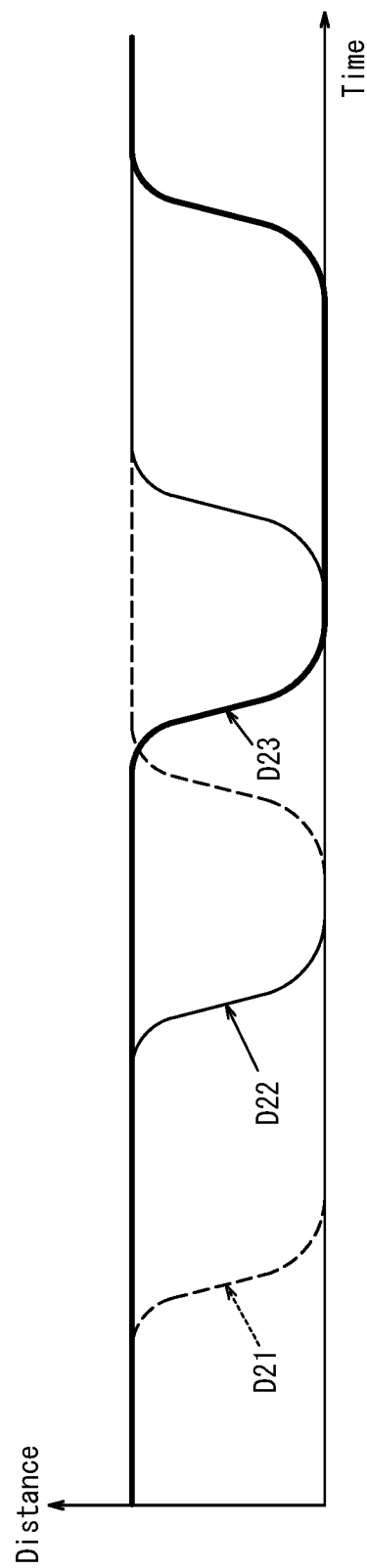
FIG. 16 schematically illustrates the change in distance to an object detected by each light-receiving element.

A method performed by the controller 11 to detect a gesture by the user based on output of the ranging sensor is described below in detail with reference to FIGS. 14 through 16. FIG. 14 schematically illustrates a ranging sensor 126. FIG. 14 is a side view of the ranging sensor 126. The ranging sensor 126 includes a light emitter 126a and a light receiver 126b. The light emitter 126a irradiates infrared laser light towards an object. The light receiver 126b receives reflected light, from the object, of the irradiated infrared light.

The light receiver 126b may include a plurality of light-receiving elements. For example, the light receiver 126b may include nine light-receiving elements arranged in a 3×3 grid, as illustrated in FIG. 15. The nine light-receiving elements each receive reflected light from the object. The three light-receiving elements arranged in the top row of the light receiver 126b are, in order from the left, Ch11, Ch12, Ch13. The three light-receiving elements arranged in the middle row of the light receiver 126b are, in order from the left, Ch21, Ch22, Ch23. The three light-receiving elements arranged in the bottom row of the light receiver 126b are, in order from the left, Ch31, Ch32, Ch33.

The ranging sensor 126 can measure the distance to the object from each of the nine light-receiving elements based on the phase difference between the infrared laser light irradiated by the light emitter 126a and the reflected light received by each of the nine light-receiving elements of the light receiver 126b. The ranging sensor 126 can detect a gesture based on the distance from each of the nine light-receiving elements to the object and the change over time in the distance.

For example, suppose that the user performs a gesture to move a hand from left to right. At this time, the distances to the object detected by the light-receiving elements Ch21, Ch22, Ch23 in the middle row are designated as D21, D22, D23. FIG. 16 schematically illustrates the change in distance to the object detected by each light-receiving element. As illustrated schematically in FIG. 16, for example, the hand that is the object first approaches the light-receiving element Ch21 located on the left side. The distance D21 to the object detected by the light-receiving element Ch21 therefore decreases. Subsequently, the hand that is the object approaches the light-receiving element Ch22 located in the middle, and the distance D22 to the object detected by the light-receiving element Ch22 decreases. Finally, the hand that is the object moves to the right, and the distance D23 to the object detected by the light-receiving element Ch23 located on the right side decreases. The order in which the hand that approached the light-receiving elements Ch21, Ch22, Ch23 moves away is also Ch21, Ch22, Ch23. Consequently, the distances D21, D22, D23 increase in this order (and return to their initial values). A gesture in the up or down direction can also be detected by the same principle using the light-receiving elements Ch12, Ch22, Ch32, for example. The ranging sensor 126 can thus detect a gesture based on the distance from each of the nine light-receiving elements to the object and the change over time in the distance.

The light receiver 126b has been described as including nine light-receiving elements, but the number of light-receiving elements in the light receiver 126b is not limited to this example. The arrangement of the light-receiving elements in FIG. 15 is also not limiting. The number and arrangement of the light-receiving elements in the light receiver 126b may be determined appropriately in accordance with the type of gestures to be detected.

The light emitter 126a of the ranging sensor 126 may include a plurality of light-emitting elements. In this case, the distance to the object from each of the nine light-emitting elements can be measured based on the phase difference between the infrared laser light emitted by each light-emitting element and the reflected light received by the light receiver 126b. By adapting the above-described principle, the ranging sensor 126 can detect a gesture in this case as well based on the distance from each of the nine light-emitting elements to the object and the change over time in the distance.

The above embodiments are not limited to being implemented as the electronic device 1. For example, the above embodiments may be implemented as a control method of a device such as the electronic device 1. Furthermore, the above embodiments may be implemented as a program executed by a device such as the electronic device 1, for example.

Much of the subject matter of the present disclosure is described as a series of operations executed by a computer system and other hardware that can execute program instructions. Examples of the computer system and other hardware include a general-purpose computer, a personal computer (PC), a dedicated computer, a workstation, a personal communications system (PCS), a mobile (cellular) phone, a mobile phone with a data processing function, an RFID receiver, a game device, an electronic notepad, a laptop computer, a global positioning system (GPS) receiver, and other programmable data processing apparatuses. It should be noted that in each embodiment, various operations or control methods are executed by a dedicated circuit (for example, individual logical gates interconnected in order to execute a particular function) implemented by program instructions (software), or by a logical block and/or program module or the like executed by one or more processors. The one or more processors that execute a logical block and/or program module or the like include, for example, one or more of a microprocessor, CPU, application specific integrated circuit (ASIC), digital signal processor (DSP), programmable logic device (PLD), field programmable gate array (FPGA), processor, controller, microcontroller, microprocessor, electronic device, other apparatus designed to be capable of executing the functions disclosed here, and/or a combination of any of the above. The embodiments disclosed here are, for example, implemented by hardware, software, firmware, middleware, microcode, or a combination of any of these. The instructions may be program code or a code segment for executing the necessary tasks. The instructions may be stored on a machine-readable, non-transitory storage medium or other medium. The code segment may indicate a combination of any of the following: procedures, functions, subprograms, programs, routines, subroutines, modules, software packages, classes, instructions, data structures, or program statements. The code segment may transmit and/or receive information, data arguments, variables, or memory content to or from another code segment or hardware circuit in order for the code segment to connect to another code segment or hardware circuit.

The storage 16 used here may also be configured as a computer-readable, tangible carrier (medium) in any of the categories of solid-state memory, magnetic disks, and optical discs. Data structures or an appropriate set of computer instructions, such as program modules, for causing a processor to execute the techniques disclosed herein are stored on these media. Examples of computer-readable media include an electrical connection with one or more wires, a magnetic disk storage medium, a magnetic cassette, a magnetic tape, or other magnetic or optical storage medium, such as a compact disc (CD), laser Disc®, digital versatile disc (DVD®), Floppy® disk, and Blu-ray Disc® (laser disc, DVD, floppy, and Blu-ray disc are registered trademarks in Japan, other countries, or both). Further examples include a portable computer disk, random access memory (RAM), read-only memory (ROM), rewritable programmable ROM such as erasable programmable read-only memory (EPROM), electrically erasable programmable read-only memory (EEPROM), or flash memory, another tangible storage medium that can store information, or a combination of any of these. The memory may be provided internal and/or external to a processor or processing unit. As used in the present disclosure, the term "memory" refers to all types of long-term storage, short-term storage, and volatile, non-volatile, or other memory. In other words, the "memory" is not limited to a particular type and/or number. The type of medium on which information is stored is not limited, either.

The invention claimed is:

1. An electronic device comprising:
a first sensor configured to detect a gesture that does not come into contact with the electronic device;
a second sensor configured to detect a touch that comes into contact with the electronic device; and
a controller configured to
increase a size of an icon when a gesture is detected by the first sensor but a touch is not detected by the second sensor, the icon being displayed on a display, the size of the icon being increased in accordance with a distance to a position where the gesture detected by the first sensor is performed; and
always decrease the size of, and perform an action associated with, the increased size icon when any touch is detected by the second sensor and a gesture is detected by the first sensor, the size of the icon during the touch being decreased and not varying based on the distance to the position where the gesture detected by the first sensor is performed.

2. The electronic device of claim 1, wherein when a gesture is detected by the first sensor, the controller is configured to increase the size of the icon as the distance to the position where the gesture detected by the first sensor is performed becomes longer.

3. The electronic device of claim 1, wherein after a gesture is detected by the first sensor and the controller increases the size of the icon, the controller is configured to decrease the size of the icon with increased size as the distance to the position where the gesture detected by the first sensor is performed becomes shorter.

4. The electronic device of claim 1, wherein when a touch is detected by the second sensor, the controller is configured to decrease the size of the icon with increased size.

5. The electronic device of claim 1, wherein when a touch is detected by the second sensor, the controller is configured to deactivate a function for detection with the first sensor.

6. A control method of an electronic device, the control method comprising:
- detecting, using a first sensor, a gesture that does not come into contact with the electronic device;
- detecting, using a second sensor, a touch that comes into contact with the electronic device;
- increasing a size of an icon when a gesture is detected by the first sensor but a touch is not detected by the second sensor, the icon being displayed on a display, the size of the icon being increased in accordance with a distance to a position where the gesture detected by the first sensor is performed; and
- always decreasing the size of, and performing an action associated with, the increased size icon when any touch is detected by the second sensor and a gesture is detected by the first sensor, the size of the icon during the touch being decreased and not varying based on the distance to the position where the gesture detected by the first sensor is performed.

7. A non-transitory computer-readable recording medium storing computer program instructions, which when executed by a computer, cause the computer to:
- detect, using a first sensor, a gesture that does not come into contact with an electronic device;
- detect, using a second sensor, a touch that comes into contact with the electronic device;
- increase a size of an icon when a gesture is detected by the first sensor, the icon being displayed at a position in an arrangement of icons on a display, the arrangement of icons indicating positions of the icons relative to each other on the display, the size of the icon being increased in accordance with a distance to a position where the gesture detected by the first sensor is performed, and the position of the icon in the arrangement being maintained regardless of the gesture;
- always decrease the size of, and perform an action associated with, the increased size icon when any touch is detected by the second sensor, the size of the icon being decreased regardless of the distance to the position where the gesture detected by the first sensor is performed; and
- while the touch is detected by the second sensor, deactivate a function for detection with the first sensor by suspending power to the first sensor.

8. The electronic device of claim 1, wherein the action is launching an application.

9. The control method of claim 6, wherein the action is launching an application.

10. The non-transitory computer-readable recording medium of claim 7, wherein the action is launching an application.

* * * * *